(12) United States Patent
Jin et al.

(10) Patent No.: US 9,715,339 B2
(45) Date of Patent: Jul. 25, 2017

(54) DISPLAY APPARATUS DISPLAYING USER INTERFACE AND METHOD OF PROVIDING THE USER INTERFACE

(71) Applicant: SAMSUNG ELECTRONICS CO., LTD., Suwon-si (KR)

(72) Inventors: Young-kyu Jin, Seoul (KR); Nam-wook Kang, Seoul (KR); Eun-mee Shin, Yongin-si (KR); Hye-won Lee, Anyang-si (KR); Joo-yoon Bae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 14/227,751

(22) Filed: Mar. 27, 2014

(65) Prior Publication Data

US 2014/0298226 A1 Oct. 2, 2014

Related U.S. Application Data

(60) Provisional application No. 61/805,632, filed on Mar. 27, 2013.

(30) Foreign Application Priority Data

Sep. 4, 2013 (KR) .......................... 10-2013-0106302

(51) Int. Cl.
*G06F 3/0488* (2013.01)
(52) U.S. Cl.
CPC ...... *G06F 3/04886* (2013.01); *G06F 3/04883* (2013.01)

(58) Field of Classification Search
CPC .................................................... G06F 3/0488
See application file for complete search history.

(56) References Cited

U.S. PATENT DOCUMENTS 5,666,502 A 9/1997 Capps
6,008,809 A 12/1999 Brooks
(Continued)

FOREIGN PATENT DOCUMENTS

EP 2 112 583 A1 10/2009
EP 2230623 A1 9/2010
(Continued)

OTHER PUBLICATIONS

Communication dated Sep. 25, 2014, issued by the European Patent Office in counterpart European Application No. 14161980.9.
(Continued)

*Primary Examiner* — David Choi
(74) *Attorney, Agent, or Firm* — Sughrue Mion, PLLC

(57) ABSTRACT

Provided are a display apparatus capable of manipulating user interface (UI) objects included in a UI, and a method of providing the UI. The display apparatus includes a touch screen which is configured to display the UI including a plurality of UI objects and receive a user input; and a controller which is configured to determine a plurality of preset sizes corresponding to the UI objects, respectively, and a plurality of pieces of information to be displayed on the UI objects, respectively, in response to the user input, and control the touch screen to display the UI objects with the preset sizes and the plurality of pieces of information.

12 Claims, 11 Drawing Sheets

(56) References Cited

U.S. PATENT DOCUMENTS

| | | | |
|---|---|---|---|
| 6,397,337 B1 | 5/2002 | Garrett et al. | |
| 7,512,400 B2 | 3/2009 | Starbuck et al. | |
| 7,657,849 B2 | 2/2010 | Chaudhri et al. | |
| 8,046,721 B2 | 10/2011 | Chaudhri et al. | |
| 8,351,897 B2 | 1/2013 | Shin et al. | |
| 8,411,046 B2 | 4/2013 | Kruzeniski et al. | |
| 9,459,788 B2* | 10/2016 | Kang | G06F 3/04883 |
| 2005/0149879 A1 | 7/2005 | Jobs et al. | |
| 2005/0243979 A1 | 11/2005 | Starbuck et al. | |
| 2006/0167861 A1 | 7/2006 | Arrouye et al. | |
| 2006/0229097 A1 | 10/2006 | Flynt et al. | |
| 2007/0099642 A1 | 5/2007 | Jin et al. | |
| 2007/0150842 A1 | 6/2007 | Chaudhri et al. | |
| 2008/0020803 A1 | 1/2008 | Rios et al. | |
| 2008/0052717 A1 | 2/2008 | Lee | |
| 2008/0166993 A1 | 7/2008 | Gautier et al. | |
| 2008/0168368 A1 | 7/2008 | Louch et al. | |
| 2008/0320033 A1 | 12/2008 | Koistinen et al. | |
| 2009/0013275 A1 | 1/2009 | May et al. | |
| 2009/0013282 A1 | 1/2009 | Mercer | |
| 2009/0019120 A1 | 1/2009 | Muguda | |
| 2009/0083847 A1 | 3/2009 | Fadell et al. | |
| 2009/0094339 A1 | 4/2009 | Allen et al. | |
| 2009/0240647 A1 | 9/2009 | Green et al. | |
| 2009/0241072 A1 | 9/2009 | Chaudhri et al. | |
| 2009/0327977 A1* | 12/2009 | Bachfischer | B60K 35/00 715/863 |
| 2010/0023892 A1 | 1/2010 | Rakesh et al. | |
| 2010/0070898 A1 | 3/2010 | Langlois et al. | |
| 2010/0088634 A1 | 4/2010 | Tsuruta et al. | |
| 2010/0146451 A1 | 6/2010 | Jun-Dong et al. | |
| 2010/0211872 A1 | 8/2010 | Rolston et al. | |
| 2010/0229115 A1 | 9/2010 | Augustine et al. | |
| 2010/0269040 A1 | 10/2010 | Lee | |
| 2010/0306705 A1 | 12/2010 | Nilsson | |
| 2010/0313156 A1 | 12/2010 | Louch et al. | |
| 2011/0016390 A1* | 1/2011 | Oh | G06F 3/0482 715/702 |
| 2011/0041101 A1* | 2/2011 | Choi | G06F 3/0488 715/863 |
| 2011/0047134 A1 | 2/2011 | Zhang et al. | |
| 2011/0093812 A1 | 4/2011 | Fong | |
| 2011/0126156 A1 | 5/2011 | Krishnaraj et al. | |
| 2011/0154290 A1 | 6/2011 | Kelly | |
| 2011/0167387 A1 | 7/2011 | Stallings et al. | |
| 2011/0175930 A1 | 7/2011 | Hwang et al. | |
| 2011/0202872 A1 | 8/2011 | Park | |
| 2011/0258581 A1 | 10/2011 | Hu | |
| 2011/0300831 A1 | 12/2011 | Chin | |
| 2011/0316884 A1 | 12/2011 | Giambalvo et al. | |
| 2012/0005569 A1 | 1/2012 | Roh | |
| 2012/0005577 A1 | 1/2012 | Chakra et al. | |
| 2012/0023573 A1 | 1/2012 | Shi | |
| 2012/0084734 A1 | 4/2012 | Wilairat | |
| 2012/0117599 A1 | 5/2012 | Jin et al. | |
| 2012/0129496 A1 | 5/2012 | Park et al. | |
| 2012/0131471 A1 | 5/2012 | Terlouw et al. | |
| 2012/0164971 A1 | 6/2012 | Choi et al. | |
| 2012/0174042 A1 | 7/2012 | Chang et al. | |
| 2012/0179969 A1 | 7/2012 | Lee et al. | |
| 2012/0190408 A1* | 7/2012 | Ferren | G02B 13/0065 455/566 |
| 2012/0210253 A1 | 8/2012 | Luna et al. | |
| 2012/0210266 A1 | 8/2012 | Jiang et al. | |
| 2012/0256863 A1 | 10/2012 | Zhang et al. | |
| 2012/0272338 A1 | 10/2012 | Falkenburg et al. | |
| 2012/0289287 A1 | 11/2012 | Kokubo | |
| 2012/0290972 A1 | 11/2012 | Yook et al. | |
| 2012/0297298 A1 | 11/2012 | Dovey et al. | |
| 2012/0297304 A1 | 11/2012 | Maxwell | |
| 2012/0309433 A1 | 12/2012 | Jeong et al. | |
| 2012/0324357 A1 | 12/2012 | Viegers et al. | |
| 2013/0042191 A1 | 2/2013 | Kim et al. | |
| 2013/0047119 A1 | 2/2013 | Lee | |
| 2013/0052993 A1 | 2/2013 | Kwon et al. | |
| 2013/0053105 A1 | 2/2013 | Lee et al. | |
| 2013/0054548 A1 | 2/2013 | Fosback et al. | |
| 2013/0063452 A1 | 3/2013 | Ali et al. | |
| 2013/0063479 A1 | 3/2013 | Butlin et al. | |
| 2013/0067376 A1 | 3/2013 | Kim et al. | |
| 2013/0083210 A1 | 4/2013 | Beckham et al. | |
| 2013/0091468 A1 | 4/2013 | Xie | |
| 2013/0139109 A1* | 5/2013 | Kim | G06F 3/04883 715/835 |
| 2013/0232256 A1 | 9/2013 | Lee et al. | |
| 2014/0298226 A1* | 10/2014 | Jin | G06F 3/04886 715/769 |
| 2017/0090738 A1 | 3/2017 | Kurtz et al. | |

FOREIGN PATENT DOCUMENTS

| | | |
|---|---|---|
| EP | 2 533 140 A1 | 12/2012 |
| EP | 2 551 762 A1 | 1/2013 |
| FR | 2971069 A | 8/2012 |
| JP | 3135104 B2 | 2/2001 |
| JP | 2004-191642 A | 7/2004 |
| JP | 2012-181847 A | 9/2012 |
| KR | 10-0683483 B1 | 2/2007 |
| KR | 10-2007-0115622 A | 12/2007 |
| KR | 10-2007-0120368 A | 12/2007 |
| KR | 10-2010-0027689 A | 3/2010 |
| KR | 10-2010-0114779 A | 10/2010 |
| KR | 10-2010-0134234 A | 12/2010 |
| KR | 10-2011-0011226 A | 2/2011 |
| KR | 10-2011-0026811 A | 3/2011 |
| KR | 10-2012-0006805 A | 1/2012 |
| KR | 10-2012-0054837 A | 5/2012 |
| KR | 10-2012-0126161 A | 11/2012 |
| KR | 10-2012-0131906 A | 12/2012 |
| KR | 10-2013-0024074 A | 3/2013 |
| KR | 10-2013-0024346 A | 3/2013 |
| RU | 2347258 C2 | 2/2009 |
| RU | 2363039 C2 | 7/2009 |
| RU | 2408923 C2 | 1/2011 |
| WO | 2010/110613 A1 | 9/2010 |
| WO | 2010/144331 A2 | 12/2010 |
| WO | 2012032180 A1 | 3/2012 |
| WO | 2013/022849 A1 | 2/2013 |

OTHER PUBLICATIONS

Communication dated Oct. 9, 2014, issued by the European Patent Office in counterpart European Application No. 14161998.1.
Communication dated Oct. 10, 2014, issued by the European Patent Office in counterpart European Application No. 14161616.9.
Communication dated Nov. 5, 2014, issued by the European Patent Office in counterpart European Application No. 14161672.2.
Communication dated Nov. 6, 2014, issued by the European Patent Office in counterpart European Application No. 14161739.9.
"Private Desktop, Product Information", Tropical Software Website, Jul. 1, 2012, 2 pages total, XP055142907.
"Private Desktop, Screen Shots", Tropical Software Website, Jul. 1, 2012, 5 pages total, XP 055142903.
J R Raphael, "Android Power Tip : Put Your Dialer on Your Home Screen (or Lock Screen)", Jan. 15, 2013, 6 pages total, XP 55143362.
Communication dated Oct. 6, 2016 issued by the Russian Patent Office in counterpart Russian Patent Application No. 2015145945/08.
Communication dated Oct. 6, 2016 issued by the European Patent Office in counterpart European Patent Application No. 14161980.9.
Gina Trapani et al; "Seven Easy Ways to Integrate Your Google Apps"; Sep. 9, 2009; XP055305805; 6 pgs. total.
Communication dated Aug. 28, 2014 issued by the European Patent Office in counterpart European Patent Application No. 14161672.2.
Communication dated Jun. 26, 2014 issued by the International Searching Authority in counterpart International Patent Application No. PCT/KR2014/002472.
Alexandra Chang; "Up Close with iOS 5: New Gestures"; Macworld; Oct. 14, 2011; 4 total pages; XP055135715.

(56) References Cited

OTHER PUBLICATIONS

"Overview of webOS—User Interface"; HP webOS Developer Center; Jan. 13, 2012; 4 total pages; XP055135739.
"HP/Palm WebOS—Multi-tasking Made Easy, Featuring the Palm Pre Plus"; Mar. 19, 2010; 1 total page; XP054975489.
Communication dated Jul. 3, 2014 issued by the International Searching Authority in counterpart International Patent Application No. PCT/KR2014/002481.
Communication dated Jul. 2, 2014 issued by the International Searching Authority in counterpart International Patent Application No. PCT/KR2014/002464.
Communication dated Jul. 2, 2014 issued by the International Searching Authority in counterpart International Patent Application No. PCT/KR2014/002444.
Communication dated Jul. 2, 2014 issued by the International Searching Authority in counterpart International Patent Application No. PCT/KR2014/002443.
Communication dated Aug. 26, 2014 issued by the European Patent Office in counterpart European Patent Application No. 14161621.9.
Communication dated Jul. 3, 2014 issued by the International Searching Authority in counterpart International Patent Application No. PCT/KR2014/002489.
Communication dated Jul. 2, 2014 issued by the International Searching Authority in counterpart International Patent Application No. PCT/KR2014/002462.
Communication dated Feb. 8, 2017, issued by the Federal Service on Intellectual Property in counterpart Russian Patent Application No. 2015145969.
Communication dated Feb. 21, 2017, issued by the European Patent Office in counterpart European Patent Application No. 14161998.1.
Communication dated May 23, 2017, issued by the Russian Patent Office in counterpart Russian Application No. 2015145945.

* cited by examiner

DISPLAY APPARATUS DISPLAYING USER INTERFACE AND METHOD OF PROVIDING THE USER INTERFACE

RELATED APPLICATIONS

This application claims priority from U.S. Provisional Patent Application No. 61/805,632, filed on Mar. 27, 2013, in the U.S. Patent and Trademark Office, and Korean Patent Application No. 10-2013-0106302, filed on Sep. 4, 2013, in the Korean Intellectual Property Office, the disclosures of which are incorporated herein in their entireties by reference.

BACKGROUND

1. Field

Exemplary embodiments relate to a display apparatus which displays a user interface (UI) and a method of providing the UI. In particular, exemplary embodiments relate to a display apparatus and a method of providing a UI which is arranged to facilitate user manipulation of the UI provided via the display apparatus.

2. Description of the Related Art

Personal computers (PCs), mobile phones, smartphones, personal digital assistants (PDAs), etc., may be configured to perform various functions. Examples of the various functions may include a function for data and voice communication, a function for capturing an image or filming a video using a camera, a function for storing a voice, a function for reproducing a music file via a speaker system, a function for displaying an image or a video, etc.

In order to support or increase the various functions of the aforementioned devices, various attempts have been made that configure a terminal and improve software and hardware.

In order to perform the various functions of the devices, various user interfaces (UIs) are provided. A UI may include a UI object configured of a widget, an application-executed screen, a menu button, a function key, and an application execution icon. The UI may provide UI objects having various sizes to a user.

However, a small UI object may display only a few pieces of information. Further, only a small number of large UI objects may be displayed due to a limited display area. Thus, in order to change a small size of UI objects into a large size, the user has to inconveniently change the small size of each of the UI objects.

SUMMARY

Exemplary embodiments may include a display apparatus capable of easily manipulating user interface (UI) objects included in a UI, and a method of providing the UI.

Additional aspects will be set forth in part in the description which follows and, in part, will be apparent from the description, or may be learned by practice of the presented embodiments.

According to an aspect of the exemplary embodiments, a display apparatus that provides a UI includes a touch screen which is configured to display the UI comprising a plurality of UI objects, and receive a user input; and a controller which is configured to determine a plurality of preset sizes corresponding to the UI objects, respectively, and a plurality of pieces of information to be displayed on the UI objects, respectively, in response to the user input, and control the touch screen to display the UI objects with the preset sizes and the plurality of pieces of information.

The user input may correspond to a user touch input which drags in a preset direction.

The controller may be configured to locate the UI objects on the UI, according to the preset sizes.

The controller may be configured to locate the UI objects on the UI, according to at least one category of the UI objects.

Each of the UI objects may include at least one of a widget, an application-executed screen, a menu button, a function key, and an application execution icon.

According to another aspect of the exemplary embodiments, a method in which a display apparatus provides a user interface (UI) includes displaying a UI including a plurality of UI objects on a screen of the display apparatus, receiving a user input on the touch screen of the display apparatus, determining a plurality of preset sizes corresponding to the UI objects and a plurality of pieces of information to be displayed on the UI objects in response to the user input, and displaying the UI objects with the preset sizes and the plurality of pieces of information.

According to another aspect of the exemplary embodiments, a non-transitory computer readable medium that stores a program, which when executed by a computer, performs displaying a UI including a plurality of UI objects on a touch screen of the display apparatus, receiving a user input on the touch screen of the display apparatus, determining a plurality of preset sizes corresponding to the UI objects and a plurality of pieces of information to be displayed on the UI objects in response to the user input, and displaying the UI objects with the preset sizes and the plurality of pieces of information.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
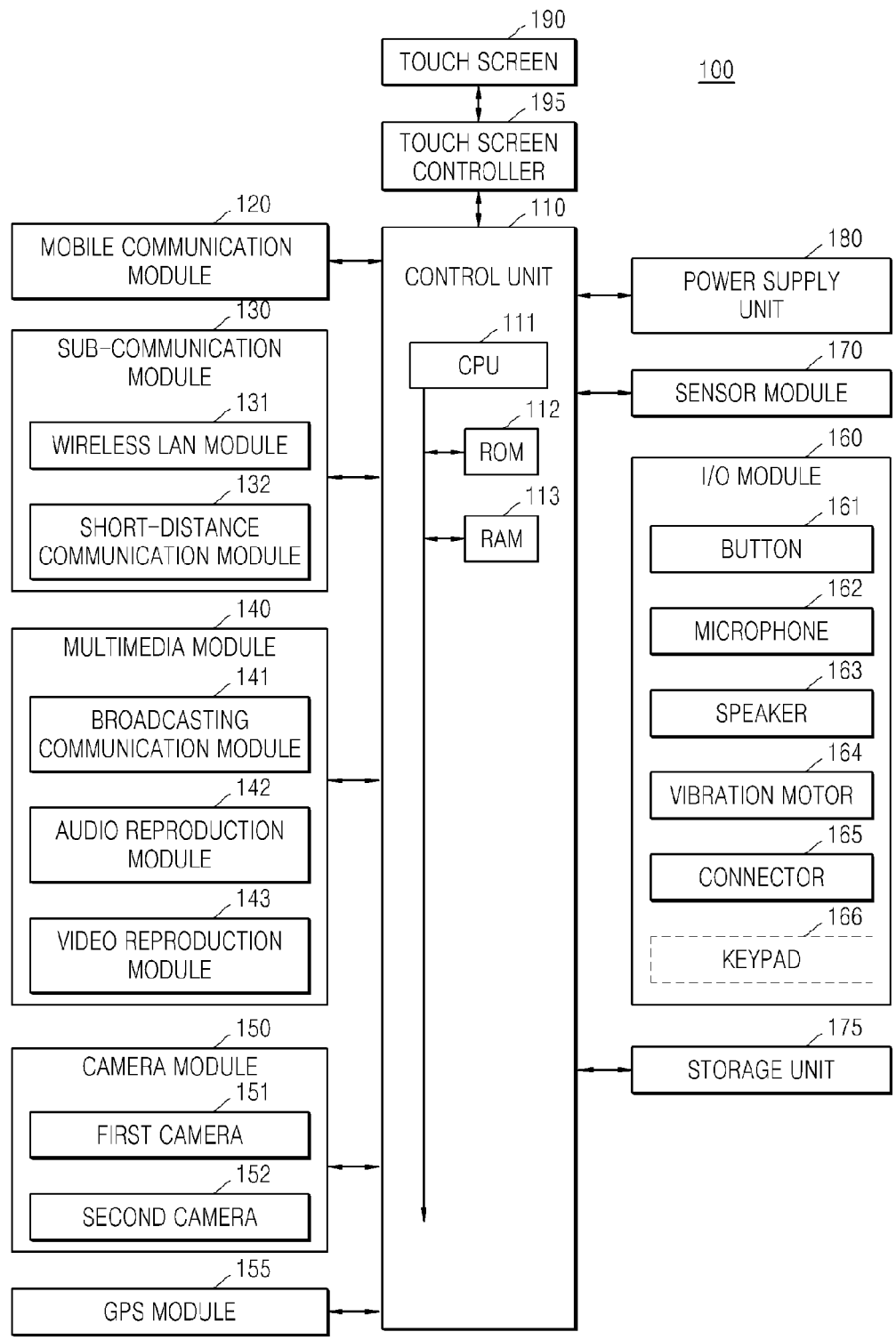
FIG. 1 is a block diagram of a display apparatus according to an embodiment.

Hereinafter, embodiments will be described in detail with reference to the attached drawings. The embodiments may, however, be embodied in many different forms, and should not be construed as being limited to the embodiments set forth herein. Rather, these embodiments are provided so that this disclosure will be thorough and complete, and will fully convey the concept of the embodiments to those skilled in the art. In the following description, well-known functions or constructions are not described in detail since they would obscure the embodiments with unnecessary detail. Similar and like reference numerals in the drawings denote like or similar elements throughout the specification.

While various terms are used to describe various components, it is obvious that the components are not limited to the terms. The terms are used only to distinguish between each of components.

Throughout the specification, it will be understood that when an element is referred to as being "connected to" or "coupled with" another element, it can be directly connected to or coupled with the other element, or it can be electrically connected to or coupled with the other element by having an intervening element interposed therebetween. Also, it will be understood that when an element is referred to as being "connected to" or "coupled with" another element, it can communicate with the other element by exchanging signals therebetween.

Also, when a part "includes" or "comprises" an element, unless there is a particular description contrary thereto, the part can further include other elements, not excluding the other elements.

Further, all examples and conditional language recited herein are to be construed as being without limitation to such specifically recited examples and conditions. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in detail in the detailed description of the exemplary embodiments. Thus, the terms used herein have to be defined based on the meaning of the terms together with the description throughout the specification.

Throughout the specification, a singular form may include plural forms, unless there is a particular description contrary thereto. Also, terms such as "comprise" or "comprising" are used to specify existence of a recited form, a number, a process, an operation, a component, and/or groups thereof, not excluding the existence of one or more other recited forms, one or more other numbers, one or more other processes, one or more other operations, one or more other components and/or groups thereof.

Expressions such as "at least one of," when preceding a list of elements, modify the entire list of elements and do not modify the individual elements of the list.

Hereinafter, embodiments will be described in detail with reference to the attached drawings.

FIG. 1 is a block diagram of a display apparatus 100 according to an embodiment.

However, FIG. 1 only illustrates the display apparatus 100 according to the present embodiment, and the display apparatus 100 according to one or more embodiments may be embodied with more or less elements than the elements shown in FIG. 1.

The display apparatus 100 may be connected to an external apparatus (not shown) using a mobile communication module 120, a sub-communication module 130, and a connector 165. The external apparatus may include at least one of another apparatus (not shown), a mobile phone (not shown), a smartphone (not shown), a tablet personal computer (PC) (not shown), and a server (not shown).

Referring to FIG. 1, the display apparatus 100 includes a touch screen 190 and a touch screen controller 195. Also, the display apparatus 100 includes a control unit 110, the mobile communication module 120, the sub-communication module 130, a multimedia module 140, a camera module 150, a global positioning system (GPS) module 155, an input/output (I/O) module 160, a sensor module 170, a storage unit 175, and a power supply unit 180. The sub-communication module 130 may include at least one of a wireless local area network (LAN) module 131 and a short-distance communication module 132. The multimedia module 140 may include at least one of a broadcasting communication module 141, an audio reproduction module 142, and a video reproduction module 143. The camera module 150 may include at least one of a first camera 151 and a second camera 152. The I/O module 160 may include at least one of a button 161, a microphone 162, a speaker 163, a vibration motor 164, the connector 165, and a keypad 166.

The control unit 110 may include a central processing unit (CPU) 111, read-only memory (ROM) 112 that stores a control program for controlling the display apparatus 100, and random-access memory (RAM) 113 that stores a signal or data input by an external source of the display apparatus 100 or is used as a memory area for operations performed by the display apparatus 100. The CPU 111 may include a single core processor, a dual core processor, a triple core processor, or a quad core processor. The CPU 111, the ROM 112, and the RAM 113 may be connected to each other via an internal BUS.

The control unit 110 may control the mobile communication module 120, the sub-communication module 130, the multimedia module 140, the camera module 150, the GPS module 155, the I/O module 160, the sensor module 170, the storage unit 175, the power supply unit 180, a touch screen 190, and the touch screen controller 195.

The mobile communication module 120 may allow the display apparatus 100 to be connected to the external apparatus via mobile communication by using one or more antennas (not shown), in response to a control by the control unit 110. The mobile communication module 120 may transmit or receive a wireless signal for making a voice call or a video call or transmitting a short message service (SMS) or a multimedia message (MMS) to a mobile phone (not shown), a smartphone (not shown), a tablet PC (not shown), or another apparatus (not shown), which has a phone number input to the display apparatus 100.

The sub-communication module 130 may include at least one of the wireless LAN module 131 and the short-distance communication module 132. For example, the sub-communication module 130 may include the wireless LAN module 131 or the short-distance communication module 132, or may include both the wireless LAN module 131 and the short-distance communication module 132.

The wireless LAN module 131 may access the Internet in response to a control by the control unit 110, via a wireless access point (wireless AP) (not shown). The wireless LAN module 131 may support the wireless LAN standard of IEEE802.11x by the Institute of Electrical and Electronics Engineers (IEEE). The short-distance communication module 132 may wirelessly perform short-distance communication between the display apparatus 100 and an image forming apparatus (not shown), in response to a control by the control unit 110. The short-distance communication may include Bluetooth, infrared data association (IrDA), ZigBee, etc.

The display apparatus 100 according to its performance may include at least one of the mobile communication module 120, the wireless LAN module 131, and the short-distance communication module 132.

The multimedia module 140 may include the broadcasting communication module 141, the audio reproduction module 142, or the video reproduction module 143. The broadcasting communication module 141 may receive, in response to a control by the control unit 110, a broadcasting signal (e.g., a television (TV) broadcasting signal, a radio broadcasting signal, or a data broadcasting signal) that is transmitted from a broadcasting station, and broadcasting additional information (e.g., an electric program guide (EPG) or an electric service guide (ESG)) via a broadcasting antenna (not shown). The audio reproduction module 142 may reproduce a digital audio file that is stored or received in response to a control by the control unit 110. The video reproduction module 143 may reproduce a digital video file that is stored or received in response to a control by the control unit 110.

The multimedia module 140 may not include the broadcasting communication module 141 and may only include the audio reproduction module 142 and the video reproduction module 143. The audio reproduction module 142 or the video reproduction module 143 of the multimedia module 140 may be included in the control unit 110.

The camera module 150 may include at least one of the first camera 151 and the second camera 152 that captures a still image or films a video in response to a control by the control unit 110. The first camera 151 or the second camera 152 may include an auxiliary light source (not shown) for providing an amount of light which is required for the capturing or filming operation. The first camera 151 may be disposed at a front surface of the display apparatus 100, and the second camera 152 may be disposed at a rear surface of the display apparatus 100. Alternatively, the first camera 151 and the second camera 152 may be disposed adjacent to each other (e.g., a gap between the first camera 151 and the second camera 152 may be greater than 1 cm and less than 8 cm). Thus, the first camera 151 and the second camera 152 may capture a three-dimensional (3D) still image or may film a 3D video.

The GPS module 155 may receive waves from a plurality of GPS satellites (not shown) on orbits of the earth and may calculate a location of the display apparatus 100 using arrival times of the waves from the GPS satellites to the display apparatus 100.

The I/O module 160 may include at least one of the button 161, the microphone 162, the speaker 163, the vibration motor 164, the connector 165, and the keypad 166.

The button 161 may be formed at a front surface, a side surface, or a rear surface of a housing of the display apparatus 100, and may include at least one of a power/lock button (not shown), a volume button (not shown), a menu button, a home button, a back button, and a search button.

The microphone 162 may receive a voice or a sound. Thus, the microphone 162 may generate an electrical signal in response to a control by the control unit 110.

The speaker 163 may output, in response to a control by the control unit 110, sounds that correspond to various signals from the mobile communication module 120, the sub-communication module 130, the multimedia module 140, or the camera module 150 to an external source of the display apparatus 100. The speaker 163 may output a sound that corresponds to a function performed by the display apparatus 100. One or more speakers 163 may be formed at an appropriate location or appropriate locations of the housing of the display apparatus 100.

The vibration motor 164 may convert an electrical signal into a mechanical signal, in response to a control by the control unit 110. For example, in a case where the display apparatus 100 in a vibration mode receives a voice call from another apparatus (not shown), the vibration motor 164 may operate. The vibration motor 164 may operate in response to a touch motion by a user who contacts the touch screen 190 and sequential movements of a touch input on the touch screen 190.

The connector 165 may be used as an interface for connecting the display apparatus 100 and another apparatus (not shown) or a power source (not shown). In response to a control by the control unit 110, the display apparatus 100 may transmit data stored in the storage unit 175 of the display apparatus 100 to another apparatus (not shown) or may receive data from the other apparatus, via a cable connected to the connector 165. Also, a power may be supplied from the power source to the display apparatus 100 or a battery (not shown) may be charged, via the cable connected to the connector 165.

The keypad 166 may receive a key input by the user so as to control the display apparatus 100. The keypad 166 includes a physical keypad (not shown) formed at the display apparatus 100 or a virtual keypad (not shown) displayed on the touch screen 190. The physical keypad formed at the display apparatus 100 may be excluded (hence, the dashed lines in FIG. 1) depending on a performance or a structure of the display apparatus 100.

The sensor module 170 includes one or more sensors that detect a status of the display apparatus 100. For example, the sensor module 170 may include a proximity sensor (not shown) for detecting whether a user accesses the display apparatus 100, a light sensor (not shown) for detecting an amount of light around the display apparatus 100, and a motion sensor (not shown) for detecting motions of the display apparatus 100 (e.g., rotation of the display apparatus 100, acceleration or vibration applied to the display apparatus 100, etc.). One or more sensors may be added or excluded depending on a performance of the display apparatus 100.

The storage unit 175 may store, in response to a control by the control unit 110, signals or a plurality of pieces of data that are input or output and correspond to operations of the mobile communication module 120, the sub-communication module 130, the multimedia module 140, the camera module 150, the GPS module 155, the I/O module 160, the sensor module 170, and the touch screen 190. The storage unit 175 may store a control program and applications for controlling the display apparatus 100 or the control unit 110.

The term "storage unit" may include the storage unit 175, the ROM 112 or the RAM 113 in the control unit 110, or a memory card (not shown) installed in the display apparatus 100. The storage unit 175 may include a non-volatile memory, a volatile memory, a hard disk drive (HDD), or a solid state drive (SSD).

The power supply unit 180 may supply, in response to a control by the control unit 110, power to at least one battery (not shown) that is disposed in the housing of the display apparatus 100. Also, the power supply unit 180 may supply the power from the power source to each of the aforementioned units of the display apparatus 100 via the cable connected to the connector 165.

The touch screen 190 may output a UI, which corresponds to various services, to the user. The touch screen 190 may transmit, to the touch screen controller 195, an analog signal that corresponds to at least one touch input to the UI. The touch screen 190 may receive the at least one touch input via a body part (e.g., a finger) of the user or a touchable input unit (e.g., a stylus pen). Also, the touch screen 190 may receive sequential movements of the at least one touch input. The touch screen 190 may transmit, to the touch screen controller 195, an analog signal that corresponds to the sequential movements of the at least one touch input.

Throughout the specification, the term 'touch input' is not limited to an input by a contact between the touch screen 190 and the body part of the user or the touchable input unit, and may include a contactless input (e.g., when a gap between the touch screen 190 and the body part is equal to or less than 1 mm). A gap that is detectable by the touch screen 190 may be changed depending on a performance or a structure of the display apparatus 100.

The touch screen 190 may be formed as a resistive touch screen, a capacitive touch screen, an infrared touch screen, or an ultrasound wave touch screen.

The touch screen controller 195 may convert the analog signal, which is received from the touch screen 190, into a digital signal (e.g., X and Y coordinates) and may transmit the digital signal to the control unit 110. The control unit 110 may control the touch screen 190 using the digital signal transmitted from the touch screen controller 195. For example, the control unit 110, in response to the touch input, may select an application execution icon (not shown) displayed on the touch screen 190 or may execute an application. The touch screen controller 195 may be included in the touch screen 190 or the control unit 110.

Figure 2:
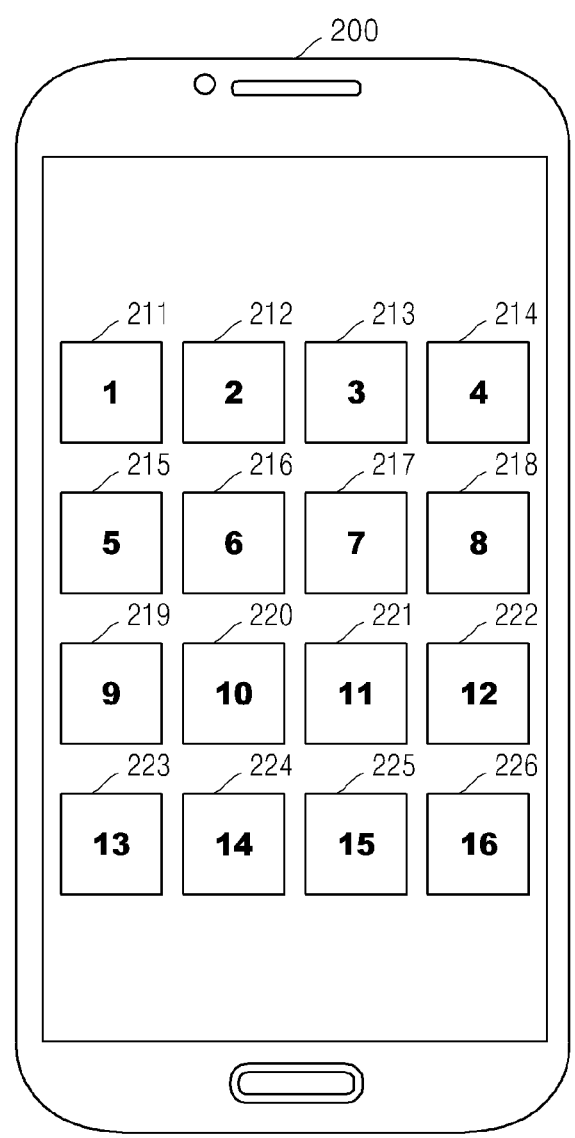
FIG. 2 illustrates an example of a user interface (UI) displayed on a display apparatus, according to another embodiment.

FIG. 2 illustrates an example of a UI displayed on a display apparatus 200, according to another embodiment. The display apparatus 200 may be variously formed as a mobile apparatus aforementioned with reference to FIG. 1, a desktop computer with a monitor, a TV, a medical data display apparatus, or the like.

As illustrated in FIG. 2, the display apparatus 200 may display a plurality of UI objects 211 through 226 on a touch screen of the display apparatus 200. The UI objects 211 through 226 are elements that configure the UI to be provided to a user.

In the present embodiment, each of the UI objects 211 through 226 may be formed as at least one of a widget, an application, an executed screen, a menu button, a function key, and an application execution icon.

Figure 3:
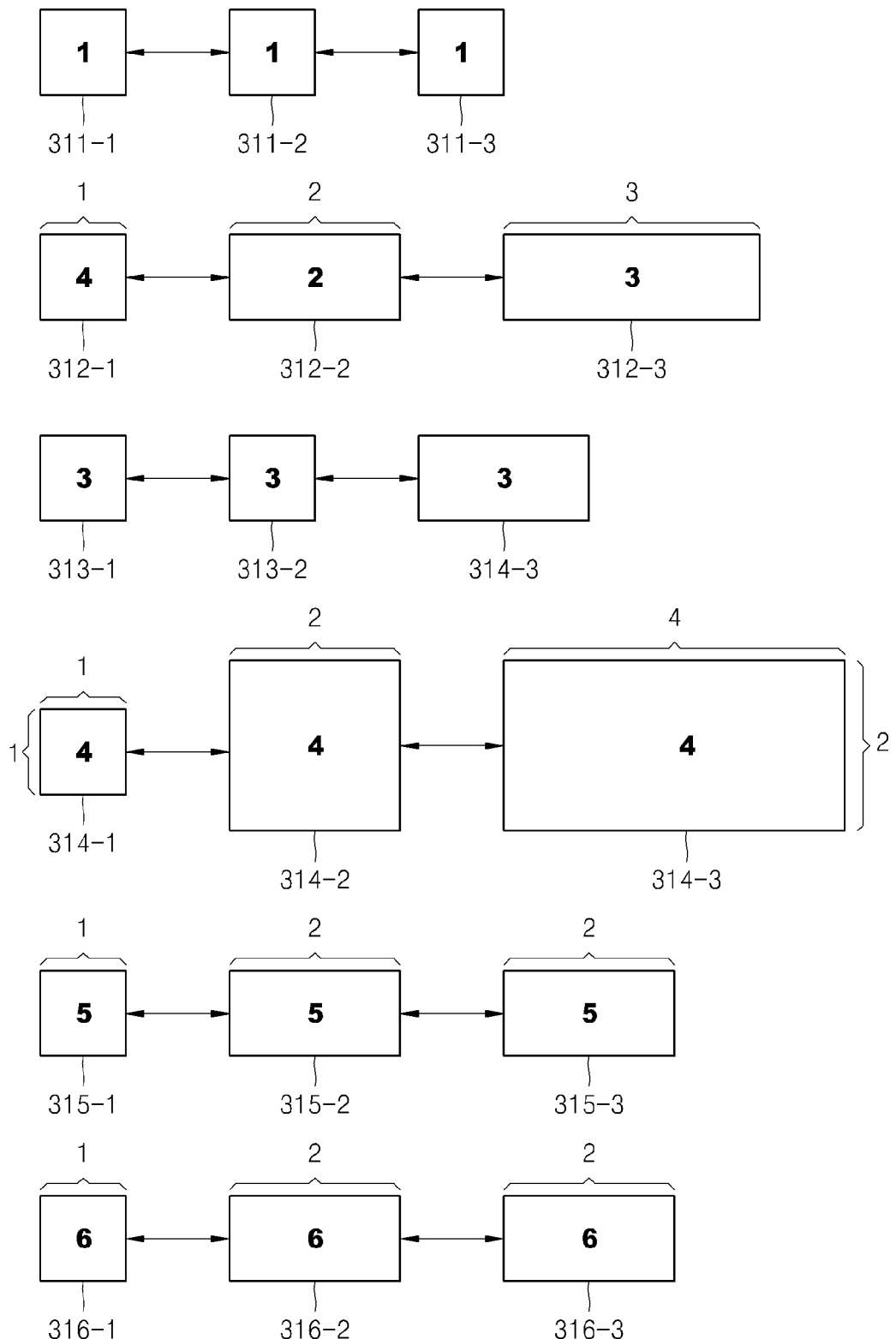
FIG. 3 illustrates an example of sizes that are preset with respect to UI objects, respectively, according to an embodiment.

FIG. 3 illustrates an example of sizes that are preset with respect to UI objects, respectively, according to an embodiment.

A size of a UI object included in a UI may not be changed, as shown in first UI objects 311-1 through 311-3 of FIG. 3. For example, if the UI object corresponds to an execution icon of a game application that does not provide a separate widget, a preset size of the execution icon of the game application may be fixed.

Alternatively, the size of the UI object included in the UI may vary according to a plurality of phases, as shown in second through sixth UI objects 312-1 through 316-3 of FIG. 3.

However, one or more embodiments are not limited to the embodiment of FIG. 3. Unlike FIG. 3, in which non-sequential sizes that correspond to the phases are set with respect to the UI objects, a rate may be preset to sequentially change a size of a UI object in another embodiment.

According to the embodiment of FIG. 3, sizes of the second through sixth UI objects 312-1 through 316-3 vary in three phases, but one or more embodiments are not limited thereto. The sizes of the UI objects may be changed in more or less phases than the three phases shown in FIG. 3.

Figure 4:
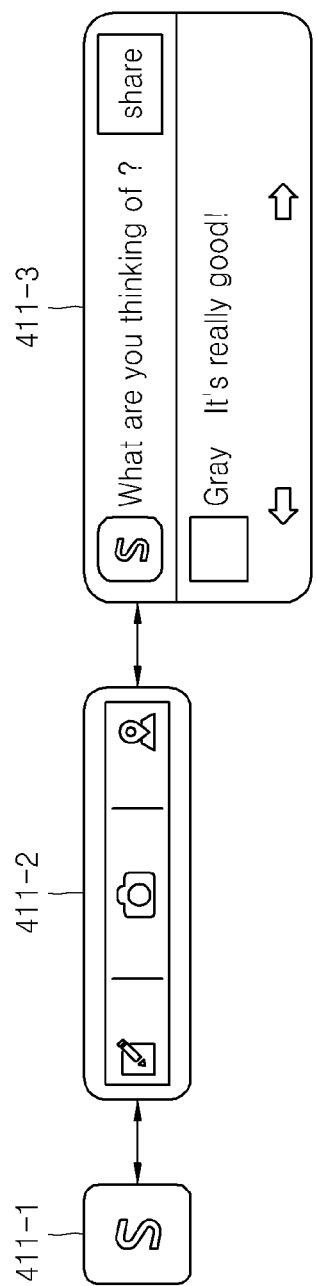
FIG. 4 is a conceptual diagram of information displayed on a UI object, according to an embodiment.

FIG. 4 is a conceptual diagram of information displayed on a UI object, according to an embodiment.

The UI object may be an icon such as an application execution icon 411-1 of FIG. 4, which is arranged to execute an application. Also, a UI object that is preset to be one-phase greater than the application execution icon 411-1 may be configured as a widget 411-2 with a preset size. For example, if the UI object is an execution icon of an application related to a social networking service (SNS), when a display apparatus (not shown) receives an input corresponding to a command of enlarging the UI object, the display apparatus may change the UI object to a widget 411-2 of FIG. 4, which provides buttons for performing functions related to the SNS.

When the display apparatus again receives an input corresponding to a command of enlarging the UI object, the widget 411-2 of FIG. 4 may be changed to a widget 411-3 with a greater size than a size of the widget 411-2 of FIG. 4, and then may further display texts updated to the SNS.

In another example, the display apparatus may sequentially change an icon corresponding to a music reproduction application with a size of 1×1 to a widget with a size of 4×1 which displays information about a reproduced music file and then to a widget with a size of 4×2 which displays the information about the reproduced music file and information about a reproduction list.

The embodiment of FIG. 4 is for convenience of description and one or more embodiments are not limited thereto. The UI object may vary in other embodiments.

FIGS. 5 through 10 illustrate a UI that is manipulated, according to embodiments.

Figure 5:
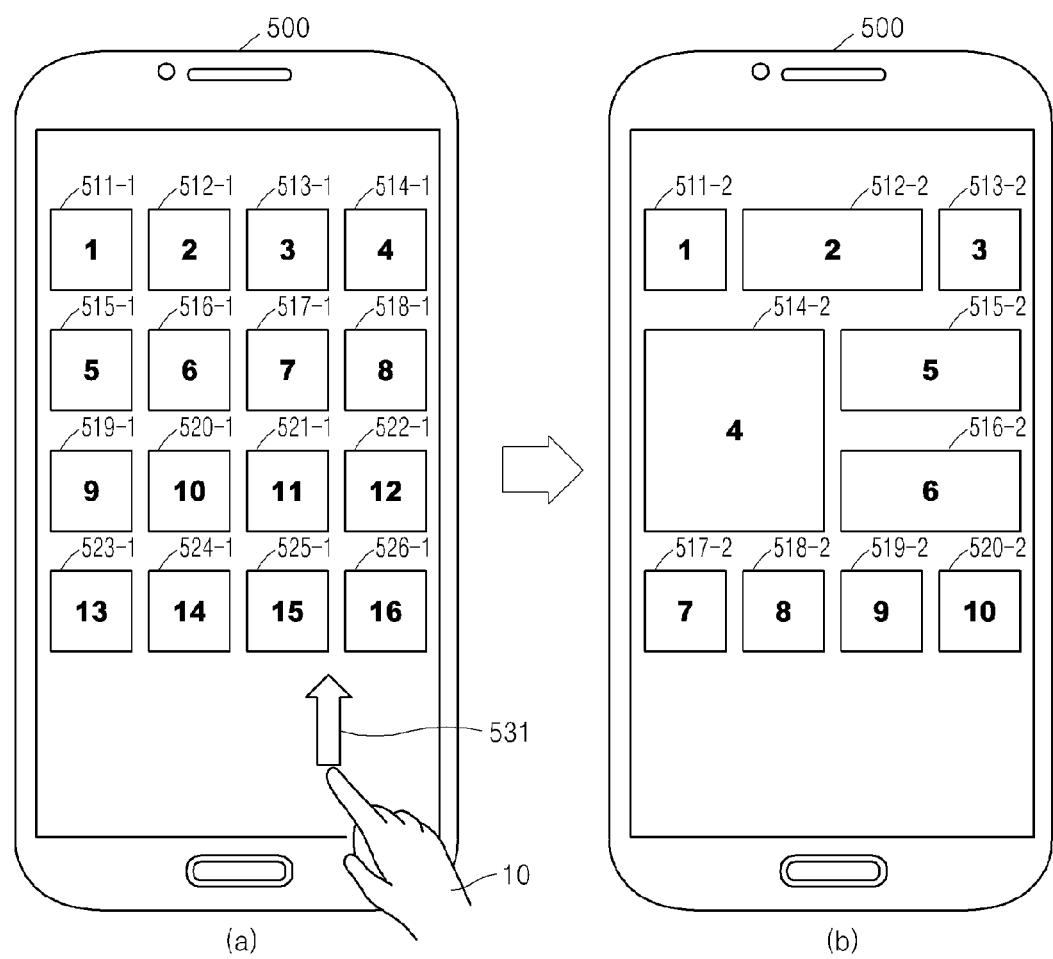
FIGS. 5 through 10 illustrate a UI that is manipulated, according to embodiments.

As illustrated in (a) of FIG. 5, while a plurality of UI objects 511-1 through 526-1 are displayed on a touch screen of a display apparatus 500, the display apparatus 500 may receive a touch input by a user 10 dragging in a first direction 531 via the touch screen. The touch input in the first direction 531 is an input by which the user 10 moves a contact point between the user 10 and the touch screen in the first direction 531 while the user 100 still contacts the touch screen.

Referring to (b) of FIG. 5, when the display apparatus 500 receives the touch input in the first direction 531, a control unit (not shown) of the display apparatus 500 may determine target sizes to be changed, as shown in FIG. 3, from sizes of the UI objects 511-1 through 526-1 shown in (a) of FIG. 5. The control unit may control the touch screen to display the UI objects 511-2 through 520-2 according to the target sizes. The control unit may re-dispose positions of the UI objects 511-1 through 526-1 so as to display UI objects 511-2 through 520-2 with the enlarged sizes. The UI objects 521-1 through 526-1 that are not displayed on a screen because the enlarged UI objects 511-2 through 520-2 are displayed may be located on another page of the UI which is not displayed on the touch screen. A method of displaying on the touch screen, the UI objects 521-1 through 526-1 that are not displayed, will be described with reference to FIG. 7.

As illustrated in (b) of FIG. 5, since the sizes of the UI objects 511-2 through 520-2 that are displayed on the screen are changed, the control unit may change information displayed on the UI objects 511-2 through 520-2 (as shown in FIG. 4).

Figure 6:
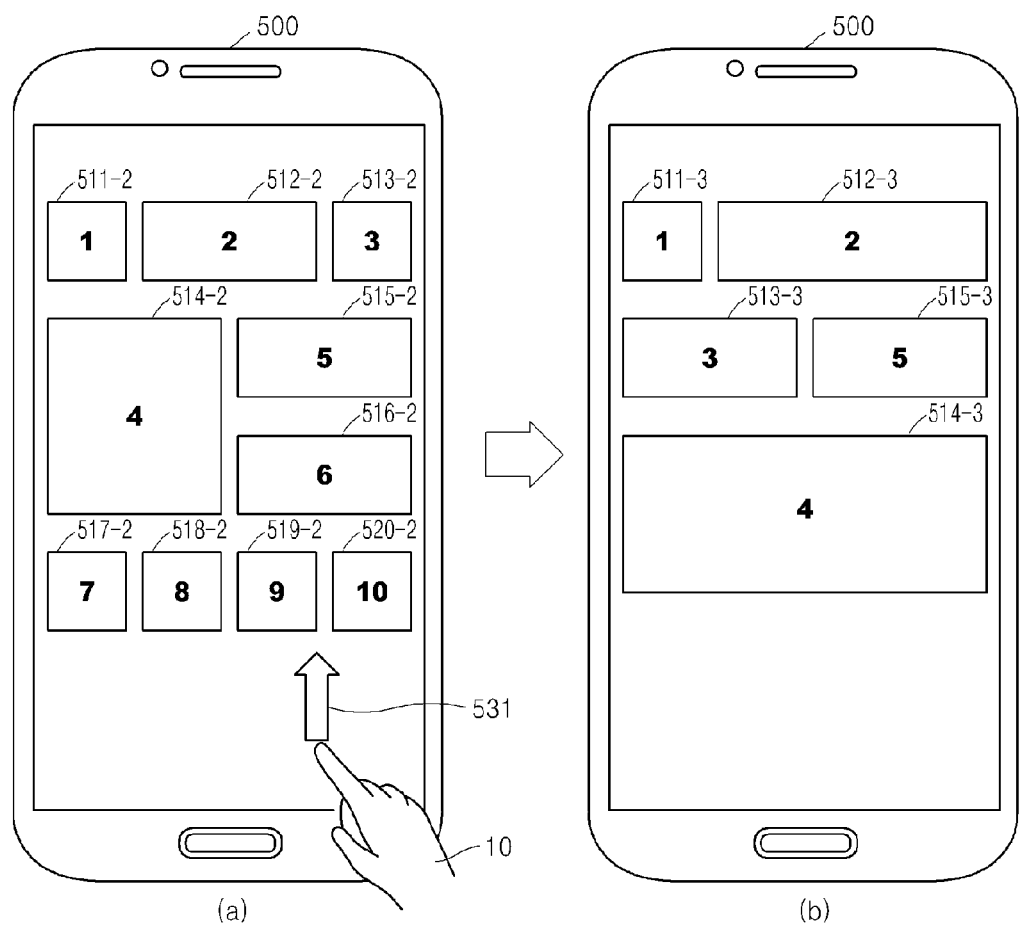

Referring to (a) of FIG. 6, while the UI objects 511-2 through 520-2 are displayed, the display apparatus 500 may receive the touch input by the user 10 dragging in the first direction 531 via the touch screen.

Referring to (b) of FIG. 6, when the touch input in the first direction 531 is received, the control unit may control the touch screen to display UI objects 511-3 through 515-3 with sizes that are determined according to preset sizes, as shown in FIG. 3, from the sizes of the UI objects 511-2 through 520-2 shown in (a) of FIG. 6. The control unit may relocate positions of the UI objects 511-2 through 520-2 so as to display the UI objects 511-3 through 515-3 with the enlarged sizes.

As illustrated in (b) of FIG. 6, since the sizes of the UI objects 511-3 through 515-3 that are displayed on a screen are changed, the control unit may change information displayed on the UI objects 511-3 through 515-3 (as shown in FIG. 4.

Figure 7:
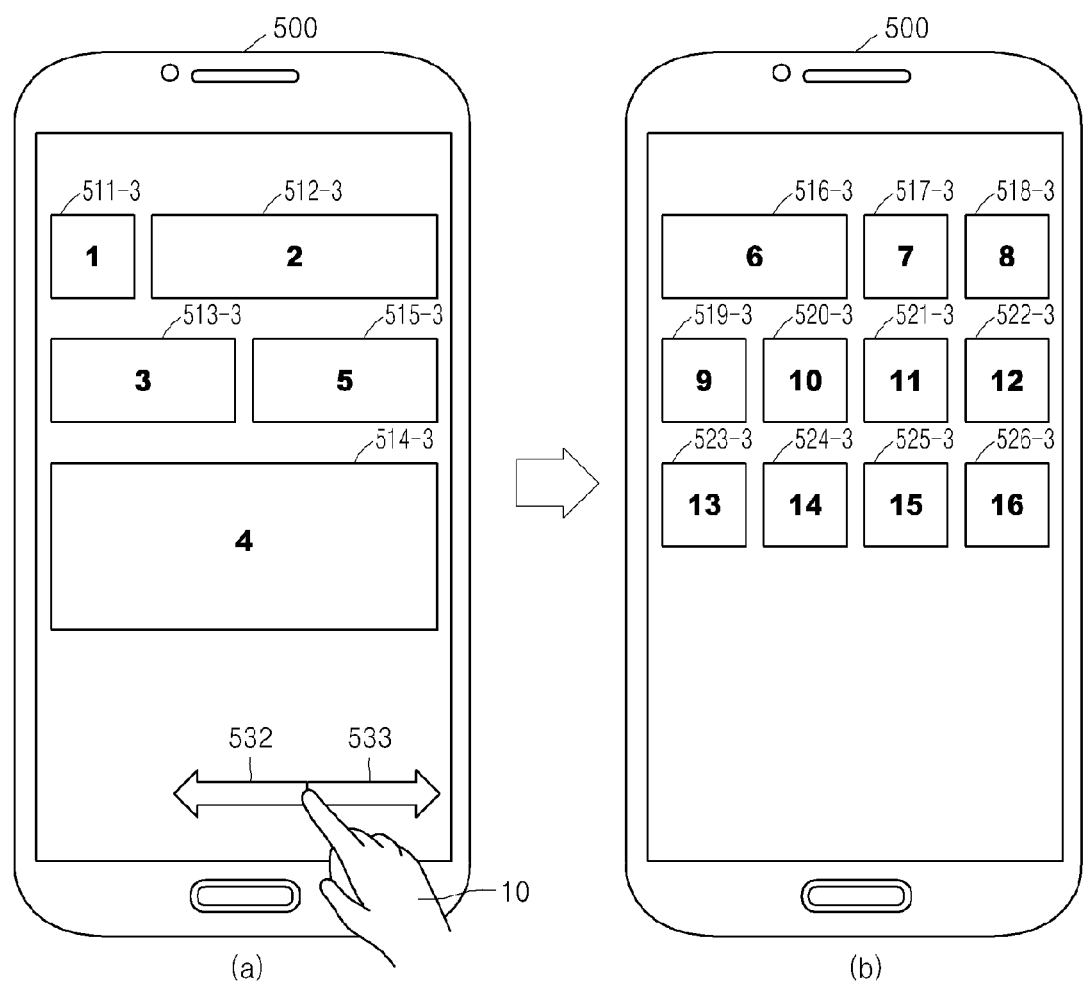

As illustrated in (a) of FIG. 7, while the UI objects 511-3 through 515-3 are displayed, the display apparatus 500 may receive a touch input by the user 10 dragging in a second direction 532 or a third direction 533 via the touch screen.

When the display apparatus 500 receives the touch input in the second direction 532 or the third direction 533, the control unit may scroll the touch screen on which the UI is displayed or may move a display target page from among pages included in the UI, according to the touch input. Referring to (b) of FIG. 7, since the screen is scrolled or the display target page from among the pages included in the UI is moved, the touch screen may display other UI objects 516-3 through 526-3.

Figure 8:
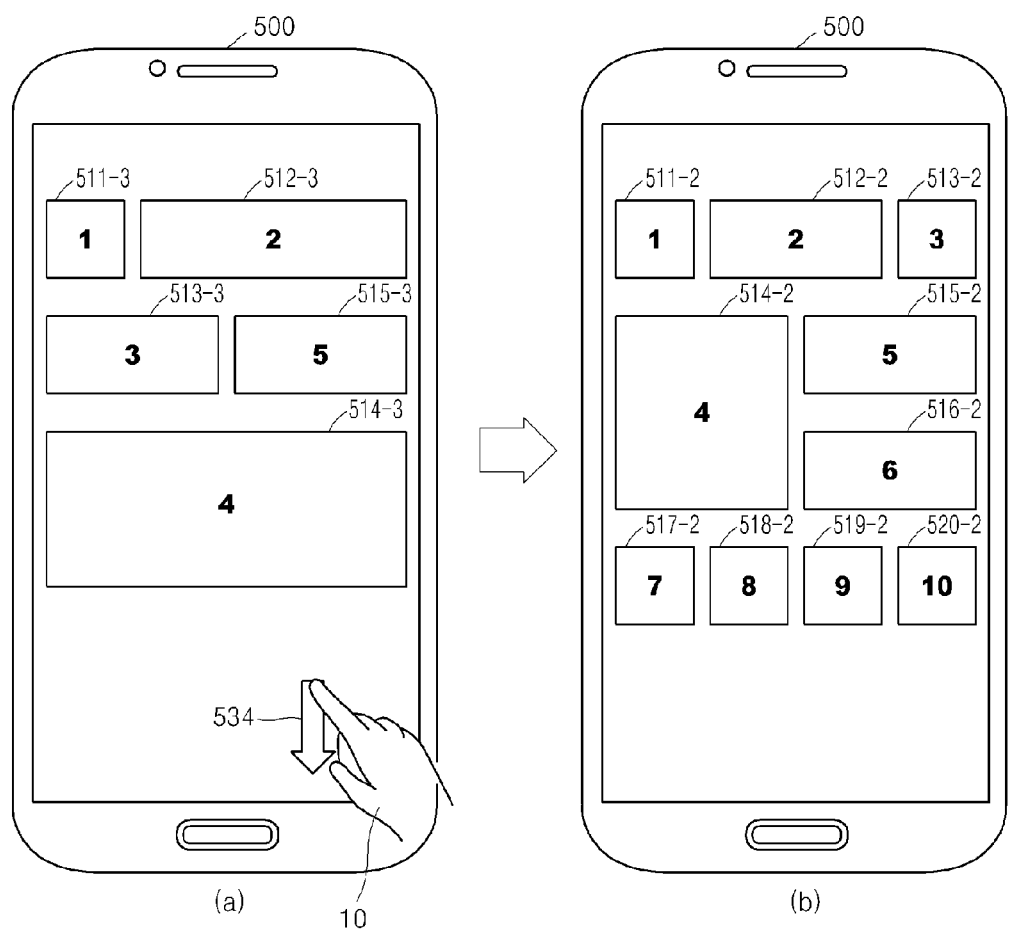

As illustrated in (a) of FIG. 8, while the UI objects 511-3 through 515-3 are displayed on the touch screen, the display apparatus 500 may receive a touch input by the user 10 dragging in a fourth direction 534 via the touch screen.

As illustrated in (b) of FIG. 8, when the touch input in the fourth direction 534 is received, the control unit may control the touch screen to display the UI objects 511-2 through 520-2 with sizes that are determined according to preset sizes, as shown in FIG. 3, from the sizes of the UI objects 511-3 through 515-3 shown in (a) of FIG. 8. Since the UI objects 511-2 through 514-2 with reduced sizes are displayed, the control unit may locate the UI objects 516-2 through 520-2, which are not displayed in (a) of FIG. 8, in an area of the touch screen in which the UI objects 511-2 through 515-2 are not displayed.

Also, as illustrated in (b) of FIG. 8, since the sizes of the UI objects 511-2 through 520-2 displayed on the touch screen are changed, the control unit may change information displayed on the UI objects 511-2 through 520-2 (as shown in FIG. 4).

As illustrated in FIG. 9(a), while the UI objects 511-2 through 520-2 are displayed on the touch screen, the display apparatus 500 may receive the touch input by the user 10 dragging in the fourth direction 534 via the touch screen.

Figure 9:
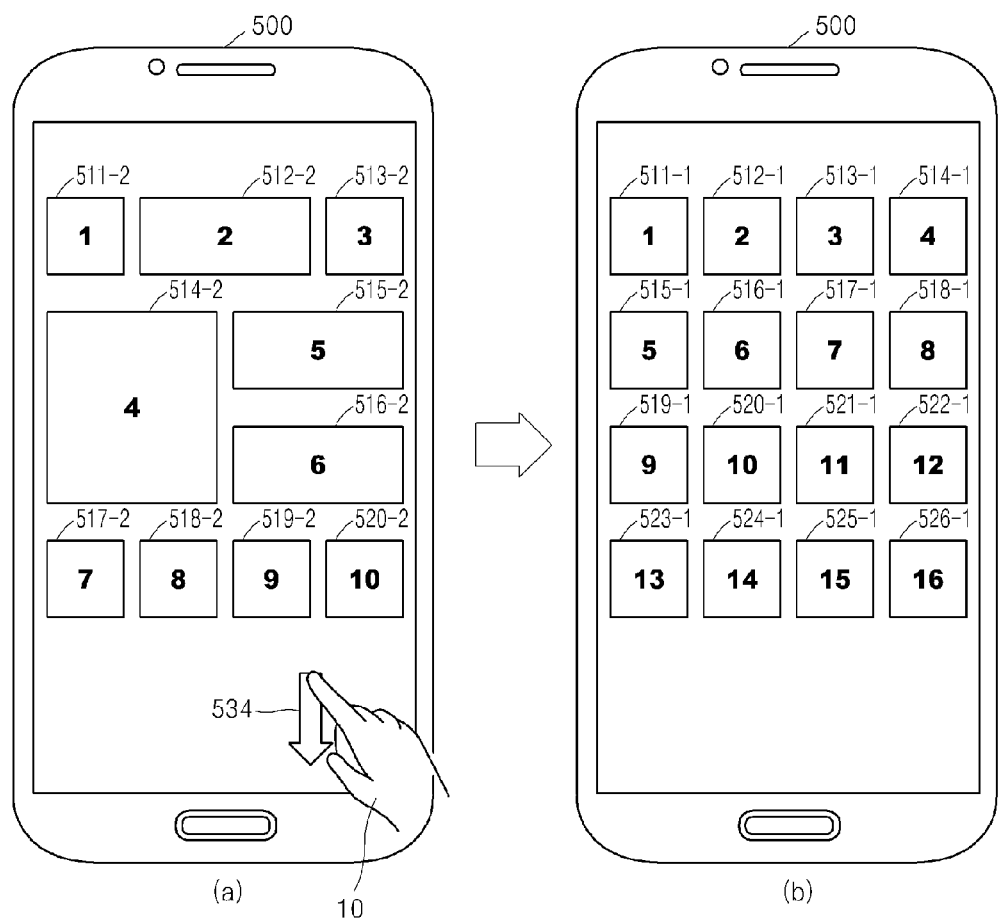

As illustrated in (b) of FIG. 9, when the touch input in the fourth direction 534 is received, the control unit may control the touch screen to display the UI objects 511-1 through 526-1 with sizes that are determined according to preset sizes, as shown in FIG. 3, from the sizes of the UI objects 511-2 through 520-2 shown in (a) of FIG. 9. Since the UI objects 511-1 through 520-1 with reduced sizes are displayed, the control unit may locate the UI objects 521-1 through 526-1, which are not displayed in (a) of FIG. 8, in an area of the touch screen in which the UI objects 511-1 through 520-1 are not displayed.

As illustrated in (b) of FIG. 9, since the sizes of the UI objects 511-1 through 526-1 displayed on the touch screen are changed, the control unit may change information displayed on the UI objects 511-1 through 526-1 (as shown in FIG. 4).

Figure 10:
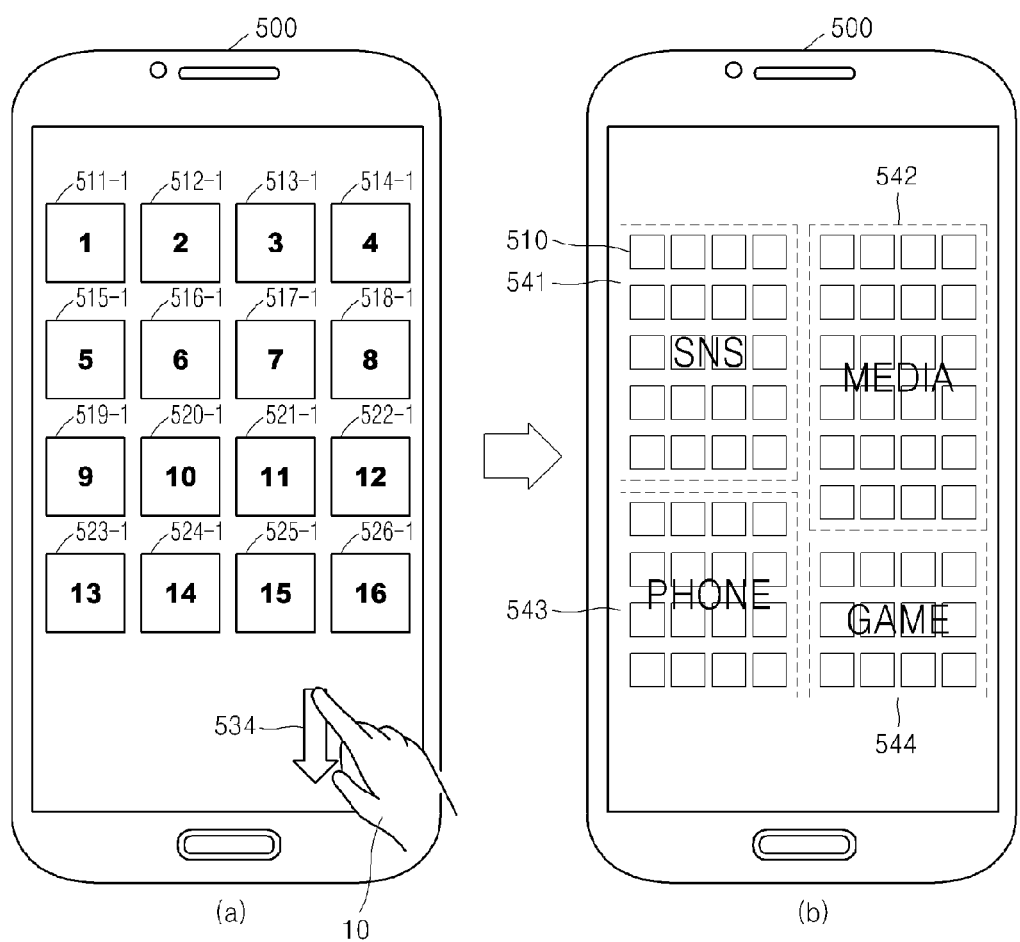

As illustrated in (a) of FIG. 10, while the UI objects 511-1 through 526-1 with smallest size are displayed on a touch screen, the display apparatus 500 may receive the touch input by the user 10 dragging in the fourth direction 534 via the touch screen.

As illustrated in (b) of FIG. 10, when the touch input in the fourth direction 534 is received, the control unit may control the touch screen to divide UI objects 510 included in a UI into a plurality of categories and to display the UI objects 510. For example, as illustrated in (b) of FIG. 10, the touch screen of the display apparatus 500 may display some of the UI objects 510 which belong to an SNS category 541, some of the UI objects 510 which belong to a media-related category 542, some of the UI objects 510 which belong to a call-related category 543, and some of the UI objects 510 which belong to a game-related category 544.

According to the present embodiment, the touch screen may simultaneously display all of the UI objects 510 included in the UI. As illustrated in (b) of FIG. 10, while the UI objects 510 are divided and displayed by the categories, e.g., the SNS category 541, the media-related category 542, the call-related category 543, and the game-related category 544, if the display apparatus 500 receives an input of selecting one of the categories, e.g., the SNS category 541, the media-related category 542, the call-related category 543, and the game-related category 544, via the touch screen, the control unit may control the touch screen to display only the UI objects 510 included in the selected category.

According to another embodiment, the touch screen may display a plurality of taps that correspond to the categories, e.g., the SNS category 541, the media-related category 542, the call-related category 543, and the game-related category 544, respectively. When one of the taps is selected, the control unit may control the touch screen to display only the UI objects 510 included in the selected tap.

Figure 11:
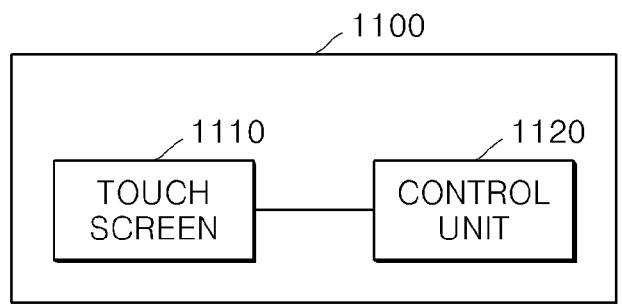
FIG. 11 is a block diagram of a structure of a display apparatus according to another embodiment.

FIG. 11 is a block diagram of a structure of a display apparatus 1100 according to another embodiment.

The display apparatus 1100 may include a touch screen 1110 and a control unit 1120.

The touch screen 1110 may display a UI including a plurality of UI objects and may receive a user input.

The control unit 1120, in response to the user input, may determine preset sizes corresponding to the UI objects, respectively, and a plurality of pieces of information to be displayed on the UI objects, respectively. Also, the control unit 1120 may control the touch screen 1110 to display the UI objects with the preset sizes and the plurality of pieces of information.

According to the present embodiment, the control unit 1120 may locate the UI objects on the UI, according to the preset sizes. Also, when sizes of the UI objects are enlarged or reduced, the control unit 1120 may enlarge or reduce a size of the UI.

According to another embodiment, the control unit 1120 may locate the UI objects, based on categories of the UI objects.

Figure 12:
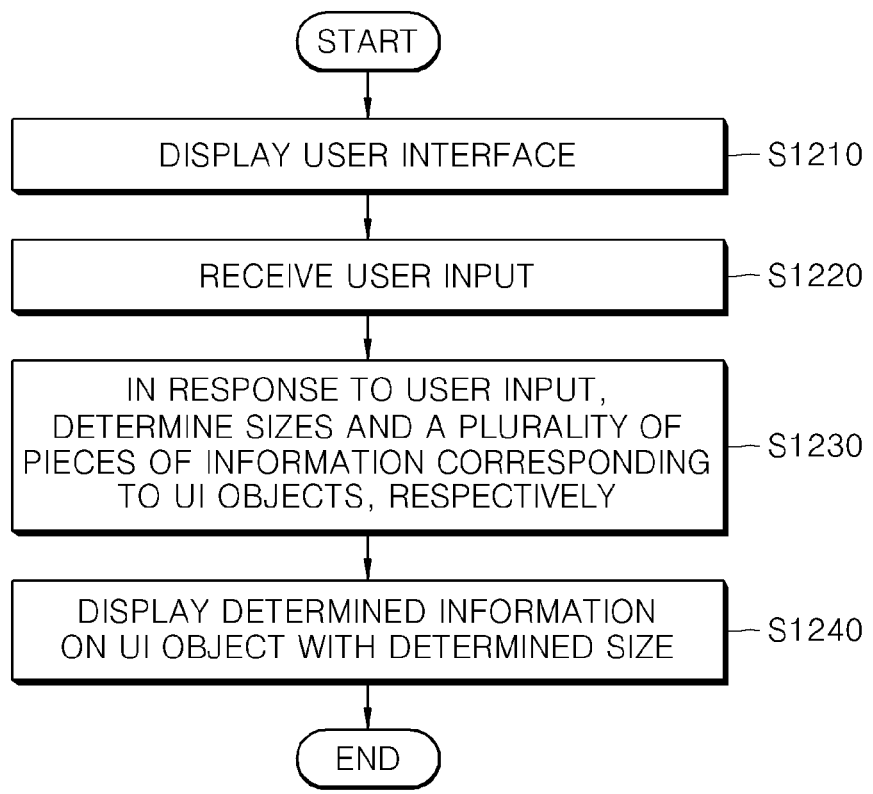
FIG. 12 is a flowchart of a method in which a display apparatus provides a UI, according to an embodiment.

FIG. 12 is a flowchart of a method in which a display apparatus provides a UI, according to an embodiment.

First, the display apparatus may display the UI on a touch screen of the display apparatus (S1210). The UI includes a plurality of UI objects.

Then, the display apparatus may receive a user input via the touch screen (S1220). In the present embodiment, the user input may be a touch input by a user dragging in a preset direction.

Afterward, the display apparatus may determine, in response to the user input, preset sizes corresponding to the UI objects, respectively, and a plurality of pieces of information to be displayed on the UI objects, respectively (S1230).

The display apparatus may display the determined information on the UI object with the preset size (S1240). In the present embodiment, the display apparatus may locate the UI objects on the UI, according to the preset sizes, and then may display the UI on which the UI objects are located.

In another embodiment, the display apparatus may locate the UI objects, based on one or more categories of the UI objects that the UI objects belong to. Afterward, the display apparatus may display the located UI objects.

The one or more embodiments of the exemplary embodiments may be embodied in a recording medium, e.g., as a program module to be executed in computers, which includes computer-readable commands. A computer storage medium may include any usable medium that may be accessed by computers, volatile and non-volatile media, and detachable and non-detachable media. Also, the computer storage medium may include both a computer storage medium and a communication medium. The computer storage medium includes all of volatile and non-volatile media, and detachable and non-detachable media, which are designed to store information including computer readable commands, data structures, program modules or other data. The communication medium includes computer-readable commands, a data structure, a program module, and other transmission mechanisms, and includes other information transmission media.

The present invention may, however, be embodied in many different forms and should not be construed as being limited to the embodiments set forth herein. Rather, these embodiments are provided so that this disclosure will be thorough and complete, and will fully convey the exemplary embodiments to those of ordinary skill in the art. For example, configuring elements that are singular forms may be executed in a distributed fashion. Also, configuring elements that are distributed may be combined and then executed.

While the present invention has been particularly shown and described with reference to exemplary embodiments thereof, it will be understood by those of ordinary skill in the art that various changes in form and details may be made therein without departing from the spirit and scope as defined by the following claims.

What is claimed is:

1. A display apparatus that provides a user interface (UI), the display apparatus comprising:
   a touch screen configured to display the UI comprising a plurality of UI objects and to receive a user input on the touch screen; and
   a processor configured to determine a plurality of first preset sizes of the plurality of UI objects and a plurality of first pieces of information to be displayed on the plurality of UI objects in a first phase, a plurality of second preset sizes of the plurality of UI objects and a plurality of second pieces of information to be displayed on the plurality of UI objects in a second phase, and a plurality of third preset sizes of the plurality of UI objects and a plurality of third pieces of information to be displayed on the plurality of UI objects in a third phase,
   wherein the processor controls the touch screen to display a number of UI objects among the plurality of UI objects having the plurality of second preset sizes and a number of pieces of information among the plurality of second pieces of information on a first page of the UI in response to receiving a first user drag input on the touch screen in a first direction,
   wherein UI objects that are not displayed on the touch screen, among the plurality of UI objects having the plurality of second preset sizes, are located on a second page of the UI which is not displayed on the touch screen,
   wherein the plurality of second preset sizes are predetermined with respect to the plurality of UI objects and the plurality of second pieces of information to be displayed on the plurality of UI objects are predetermined with respect to the plurality of UI objects,
   wherein the processor controls the touch screen to display a number of UI objects among the plurality of UI objects having the plurality of third preset sizes and a number of pieces of information among the plurality of third pieces of information in response to receiving a second user drag input on the touch screen in the first direction, and
   wherein the processor controls the touch screen to display the number of UI objects among the plurality of UI objects having the plurality of second preset sizes and the number of pieces of information among the plurality of second pieces of information in response to receiving a third user drag input on the touch screen in a second direction opposite to the first direction.

2. The display apparatus of claim 1, wherein the processor is further configured to locate the plurality of UI objects on the UI according to at least one category of the plurality of UI objects, respectively.

3. The display apparatus of claim 1, wherein each of the plurality of UI objects comprises at least one of a widget, an application-executed screen, a menu button, a function key, and an application execution icon.

4. A method in which a display apparatus provides a user interface (UI), the method comprising:
   displaying a UI comprising a plurality of first preset sizes of a plurality of UI objects and a plurality of first pieces of information displayed on the plurality of UI objects on a touch screen of the display apparatus;
   receiving a first user drag input on the touch screen in a first directions;
   in response to receiving the first user drag input on the touch screen, determining a plurality of second preset sizes of the plurality of UI objects and a plurality of second pieces of information to be displayed on the plurality of UI objects and displaying a number of UI objects among the plurality of UI objects having the plurality of second preset sizes and a number of pieces of information among the plurality of second pieces of information on the touch screen on a first page of the UI,
   wherein UI objects that are not displayed on the touch screen, among the plurality of UI objects having the plurality of second preset sizes, are located on a second page of the UI which is not displayed on the touch screen,
   wherein the plurality of second preset sizes are predetermined with respect to the plurality of UI objects and the plurality of second pieces of information to be displayed on the plurality of UI objects are predetermined with respect to the plurality of UI objects,
   wherein the method further comprises:
   in response to receiving a second user drag input on the touch screen in the first direction, determining a plurality of third preset sizes of the plurality of UI objects and a plurality of third pieces of information to be displayed on the plurality of UI objects and displaying a number of UI objects among the plurality of third preset sizes of the plurality of UI objects and a number of pieces of information among the plurality of third pieces of information on the touch screen, and in response to receiving a third user drag input on the touch screen in a second direction opposite to the first direction, displaying the number of UI objects among the plurality of UI objects having the plurality of second preset sizes and the number of pieces of information among the plurality of second pieces of information on the touch screen.

5. The method of claim 4, further comprising:

changing a plurality of positions corresponding to the plurality of UI objects on the UI according to at least one category of the plurality of UI objects, respectively.

6. The method of claim 5, wherein the plurality of UI objects are divided and displayed according to the at least one category, respectively.

7. The method of claim 4, wherein the plurality of pieces of information are information which correspond to a type of the plurality of UI objects, respectively.

8. The method of claim 7, wherein each type of the plurality of UI objects comprises at least one of a widget, an application-executed screen, a menu button, a function key, and an application execution icon.

9. A non-transitory computer readable medium that stores a program, which when executed by a computer, performs:

displaying a UI comprising a plurality of first preset sizes of a plurality of UI objects and a plurality of first pieces of information displayed on the plurality of UI objects on a touch screen of a display apparatus;

receiving a first user drag input on the touch screen in a first direction;

in response to receiving the first user drag input on the touch screen, determining a plurality of second preset sizes of the plurality of UI objects and a plurality of second pieces of information to be displayed on the plurality of UI objects and displaying a number of UI objects among the plurality of UI objects having the plurality of second preset sizes and a number of pieces of information among the plurality of second pieces of information on the touch screen on a first page of the UI, wherein UI objects that are not displayed on the touch screen, among the plurality of UI objects having the plurality of second preset sizes, are located on a second page of the UI which is not displayed on the touch screen, wherein the plurality of second preset sizes are predetermined with respect to the plurality of UI objects and the plurality of second pieces of information to be displayed on the plurality of UI objects are predetermined with respect to the plurality of UI objects, wherein the program, when executed by the computer, further performs:

in response to receiving a second user drag input on the touch screen in the first direction, determining a plurality of third preset sizes of the plurality of UI objects and a plurality of third pieces of information to be displayed on the plurality of UI objects and displaying a number of UI objects among the plurality of third preset sizes of the plurality of UI objects and a number of pieces of information among the plurality of third pieces of information on the touch screen, and in response to receiving a third user drag input on the touch screen in a second direction opposite to the first direction, displaying the number of UI objects among the plurality of UI objects having the plurality of second preset sizes and the number of pieces of information among the plurality of second pieces of information on the touch screen.

10. The display apparatus of claim 1, wherein the processor controls the touch screen to display the UI objects located on the second page of the UI which was not displayed on the touch screen in response to receiving a user drag input on the touch screen in a third direction different from each of the first direction and the second direction.

11. The method of claim 4, wherein the method further comprises displaying, on the touch screen, the UI objects located on the second page of the UI which was not displayed on the touch screen in response to receiving a user drag input on the touch screen in a third direction different from each of the first direction and the second direction.

12. The non-transitory computer readable medium of claim 9, wherein the program, when executed by the computer, further performs displaying, on the touch screen, the UI objects located on the second page of the UI which was not displayed on the touch screen in response to receiving a user drag input on the touch screen in a third direction different from each of the first direction and the second direction.

* * * * *